PLURALITY OF SOURCES CONNECTED IN PARALLEL TO PRODUCE
A TIMING PULSE OUTPUT WHILE ANY SOURCE IS OPERATIVE
Filed July 28, 1966

INVENTOR
R. L. OVERSTREET, JR.
BY
[signature]
ATTORNEY

United States Patent Office 3,479,603

Patented Nov. 18, 1969

3,479,603

A PLURALITY OF SOURCES CONNECTED IN PARALLEL TO PRODUCE A TIMING PULSE OUTPUT WHILE ANY SOURCE IS OPERATIVE

Robert L. Overstreet, Jr., Burlington, N.C., assignor to Bell Telephone Laboratories, Incorporated, Murray Hill, N.J., a corporation of New York Filed July 28, 1966, Ser. No. 568,464
Int. Cl. H03k *1/12*
U.S. Cl. 328—61 7 Claims

ABSTRACT OF THE DISCLOSURE

The output of each of a plurality of pulse sources is applied to a respective logic circuit which produces alternating binary ONE and ZERO outputs in synchronism with its source when the source is functioning correctly and a constant ZERO output when its source fails. The logic circuit outputs, in turn, are applied to an OR gate which produces alternating ONE and ZERO outputs as long as any one of the sources is functioning correctly.

Figure 1:
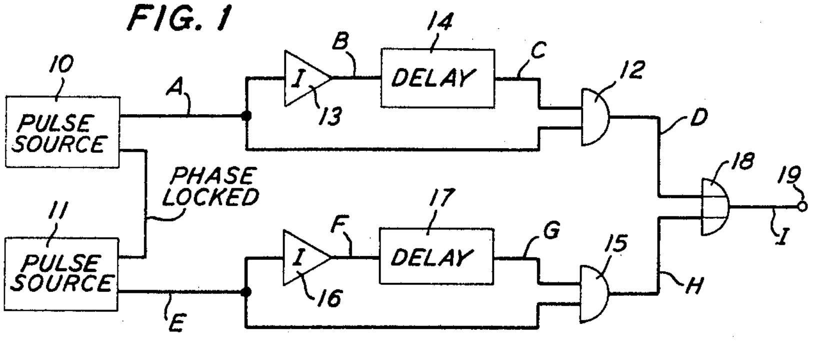

This invention relates to sources for producing timing or "clocking" signals.

Regularly recurring signals for timing purposes are required in various types of electronic apparatus. In many uses these signals should be failure-free as failures produce apparatus malfunctions. Notwithstanding this requirement, failure-free performance appears to be impossible. It is possible, however, to reduce the possibilities of failures. One way this has been accomplished is by techniques that combine the outputs of a plurality of sources so that the failure of one or more but not all sources does not adversely affect the combined output. U.S. Patent 3,139,530 issued to F. E. DeMotte on June 30, 1964, for example, discloses a combination that adds the outputs of a plurality of substantially identical but non-phase locked sine wave sources. The DeMotte combination output is useful in many applications; it may be unacceptable in other applications, however, because of a phase modulation characteristic.

Another technique to improve reliability combines the outputs of a plurality of phase-locked pulse sources by applying these outputs to respective inputs of an OR gate. The successful operation of this technique has required the sources, if they fail, to fail in the binary ZERO state as otherwise the OR gate will produce a constant binary ONE output. Such a limitation restricts the use of this technique.

An object of the present invention is to combine the outputs of a plurality of phase-locked pulse sources so that the combined output does not fail when one or more but not all of the sources fail.

Another object of the invention is to make available the outputs of pulse sources only when the respective sources are producing pulses in a regularly recurring manner.

These and other objects of the invention are achieved by applying the output of each of a plurality of pulse sources to a respective logic circuit that produces alternating binary ONE and ZERO outputs in synchronism with its source when the source is functioning correctly and a constant ZERO output when its source has failed. The logic circuit outputs, in turn, are applied to an OR gate which produces alternating ONE and ZERO outputs as long as any one of the sources is functioning.

A feature of the invention is the aforementioned logic circuits. Each of these circuits includes two paths. One path inverts an input pulse train so that the binary ONE–ZERO relationship is reversed. Furthermore, one of the paths delays the pulse train by one-half of its pulse period. The path outputs are then applied to an AND gate. As will be demonstrated in the following discussion with respect to specific embodiments, the AND gate output is a version of the original pulse train only when the pulse periods of the original pulse train remain within specific limits; otherwise, the AND gate produces a constant binary ZERO output. In effect, these logic circuits function as bandpass filters.

Another feature of the invention is the combination of the aforementioned logic circuits with the OR gate to produce a non-blocking OR gate combination. This combination functions to produce a predetermined regularly recurring pulse train output as long as a similar pulse train is applied to at least one of the logic circuits, regardless of the states of the inputs to the other logic circuits.

Other objects and features of the invention will become apparent from a study of the following detailed description of two embodiments.

Figure 3:
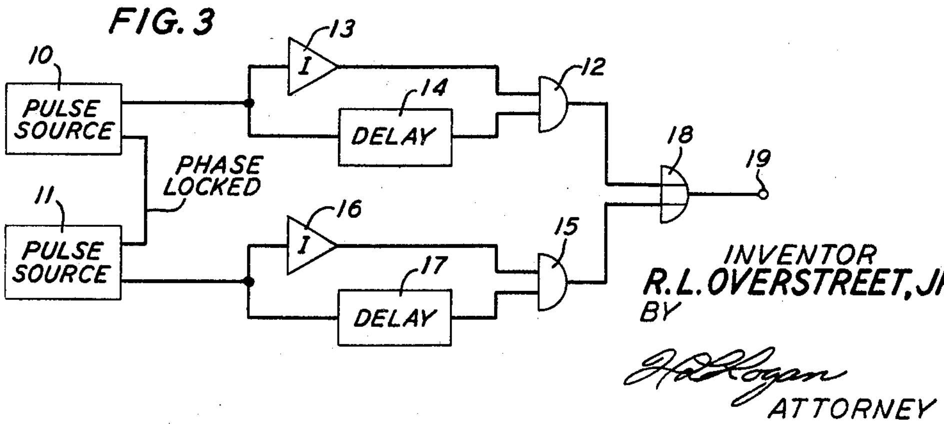

In the drawings:

FIGS. 1 and 3 each illustrate an embodiment of the invention, and

Figure 2:
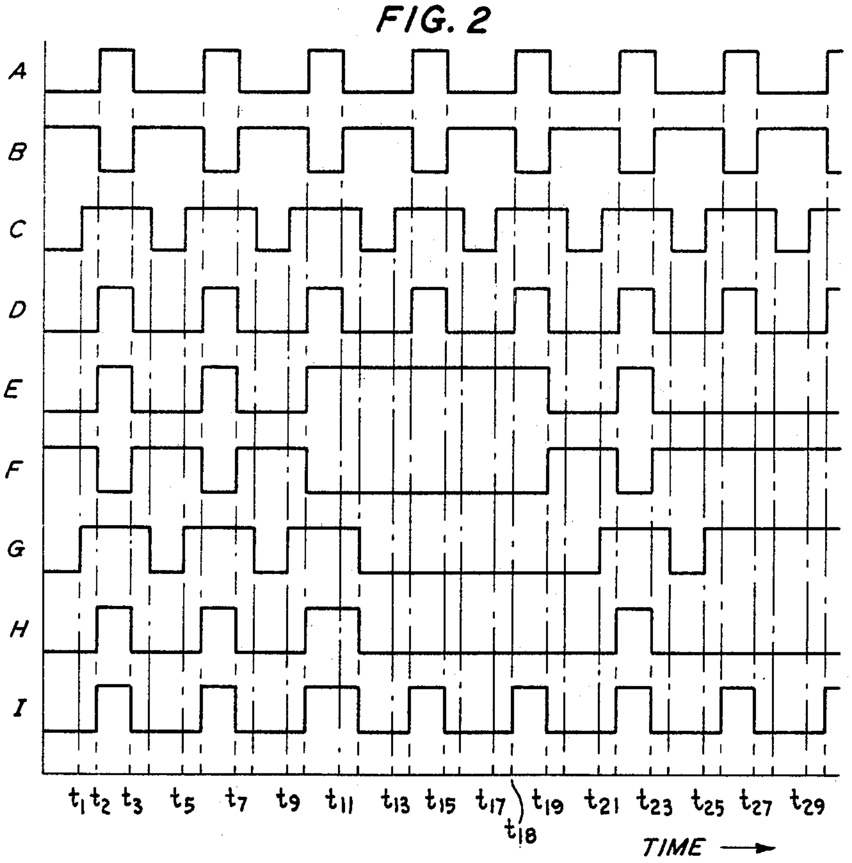

FIG. 2 shows a plurality of waveforms representing outputs of the various elements of the embodiment of FIG. 1.

The embodiment of FIG. 1 includes a pair of phase-locked sources 10 and 11 that normally produce pulses in a regularly recurring manner. The output of source 10 is fed directly to one input of an AND gate 12 and also by way of an inverter 13 and a delay circuit 14 to another input of AND gate 12. Similarly, the output of source 11 is fed directly to one input of an AND gate 15 and also by way of an inverter 16 and a delay circuit 17 to another input of AND gate 15. Delay circuits 14 and 17 each provides a delay substantially equal to one-half of the pulse period of the source outputs. The outputs of AND gates 12 and 15 are, in turn, applied to an OR gate 18 whose output is applied to a terminal 19. The various outputs of the elements of this combination have been identified by the letters A through I.

The operation of the embodiment of FIG. 1 is now presented with the help of the waveforms of FIG. 2 which represent typical outputs of the elements of FIG. 1. In the following explanation, the upper portions of the outputs are referred to as binary ONES while the lower portions are referred to as binary ZEROS. Other forms of reference may be used as appreciated by those skilled in the art.

The outputs of sources 10 and 11 are identified as A and E, respectively. It should be noted that output E indicates that source 11 failed twice because the output is in the ONE state from times *t*11 to *t*18 and in the ZERO state from *t*26 through *t*30.

Output A is inverted by inverter 13 to produce output B which, in turn, is delayed one-half of a pulse period by delay circuit 14 to produce output C. When outputs A and C are both ONES, AND gate 12 output D is also a ONE as shown, for example, in FIG. 2 between *t*2 and *t*3 and between *t*6 and *t*7.

Outputs F, G and H are produced in a similar manner in response to output E.

When outputs D and/or H are ONES, OR gate 18 output I is also a ONE. From the explanation thus far, it is believed apparent that output I is identical to outputs A and E when sources 10 and 11 are functioning correctly.

The operations of the combination of FIG. 1 when one of the sources fails is now discussed.

As mentioned previously, output E shows source 11 to have failed in the ONE state between *t*11 and *t*18. This failure causes output G to be a ZERO from *t*12 to *t*21, which prevents AND gate 15 from producing a ONE output (see H) between *t*12 and *t*18 in response to the ONE output from source 11. The failure of source 11 in the ONE state does produce, however, a wider pulse between *t*10 and *t*12 than would have been produced if the source had not failed. This wider pulse appears, of course, in output I of OR gate 18. As this pulse was lengthened by adding to its trailing edge and, furthermore, because most timing functions are performed in response to leading edges, this extra width does not in many uses affect the timing action produced by the pulse train.

Output E also shows source 11 to have failed in the ZERO state from *t*26 through *t*30. This failure causes output G to remain in a ONE state following *t*28. Because, however, ONES do not appear in output E after *t*23, AND gate 15 does not produce ONE outputs after *t*23 (see waveform H). Output D does, however, cause output I to continue in its regularly recurring pulse form.

Another embodiment of the invention is shown in FIG. 3. Since the same elements appear in this embodiment as those in that of FIG. 1, the same symbols have been used to identify them. The difference between the two embodiments is that each of the logic circuits of the latter embodiment has the inverter in one lead connected to the AND gate while the delay circuit is in the other lead.

The operation of the combination of FIG. 3 is very similar to that of FIG. 1 and is believed to be readily apparent in view of the discussion presented with respect to FIG. 1. One point that should be noted is that the output of OR gate 18 is one-half of a pulse period displaced from the ouput of sources 10 and 11. This is produced as a result of the source outputs being either inverted or delayed before being applied to the AND gates.

A feature of the invention is the above described logic circuits, each of which comprises an inverter, a delay circuit and an AND gate. Each of these circuits functions as a bandpass filter. In particular, ONES are produced by each AND gate only when the pulse repetition rates are such that ONES are applied simultaneously to both inputs of the AND gate. Furthermore, the bandwidths of the circuits are related to the ratio of the ONE durations to the ZERO durations of the source outputs; that is, the smaller this ratio, the larger the bandwidth. This frequency sensitivity tends to filter out unwanted unharmonic noise. To put it another way, a two-out-of-three vote is taken where frequency is the implicit third vote.

The invention has been described through embodiments using two phase-locked pulse sources. Increased reliability may be achieved by increasing the number of phase-locked sources, with, of course, a similar increase it the number of logic circuits.

The delay circuits may take any one of a number of forms. They may, for example, comprise a string of standard digital inverters.

Although only two embodiments of the invention have been described in detail, it is to be understood that various other embodiments may be devised by those skilled in the art without departing from the spirit and scope of the invention.

What is claimed is:

1. In combination a plurality of pulse sources, synchronizing means interconnecting said sources, a plurality of logic circuits equal in number to said plurality of sources, each of said logic circuits comprising an AND gate and a pair of paths connected between said AND gate and one of said sources, respectively, one of said paths including an inverter and, furthermore, one of said paths including delay means providing a delay substantially equal to one-half the period of the pulses from said sources, an OR gate, means connecting the outputs of said AND gates to said OR gate, and an output terminal connected to the output of said OR gate.

2. A combination in accordance with claim 1 in which each of said logic circuits has said inverter and said delay means in the same path.

3. A combination in accordance with claim 1 in which each of said logic circuits has said inverter in one of said paths and said delay means in the other of said paths.

4. In combination a plurality of logic circuits, each of said logic circuits comprising an input terminal, an AND gate and two paths connected between said input terminal and respective inputs on said AND gate, one of said paths in each logic circuit including an inverter and, furthermore, one of said paths in each logic circuit including delay means providing a delay substantially equal to one-half the period of the pulses from said sources, an OR gate, means connecting the outputs of said AND gates to said OR gate, and an output terminal connected to the output of said OR gate.

5. In combination a plurality of phase-locked pulse sources, a like plurality of AND gates, first and second paths connected between said sources and said AND gates, respectively, each of said first paths including a delay means providing a delay substantially equal to one-half of the period of the pulses from said sources, one of said paths connected between each of said sources and said AND gates including an inverter, an OR gate, means connecting the outputs of each of said AND gates to said OR gate, and an output terminal connected to the output of said OR gate.

6. A combination in accordance with claim 5 in which said inverters are in said first paths.

7. A combination in accordance with claim 5 in which said inverters are in the paths other than said first paths.

References Cited

UNITED STATES PATENTS

| | | | |
|---|---|---|---|
| 3,028,552 | 4/1962 | Hahs | 328—63 X |
| 3,116,477 | 12/1963 | Bradbury | 307—219 X |

DONALD D. FORRER, Primary Examiner

U.S. Cl. X.R.

307—204, 208, 219, 269; 328—63; 331—49